H. VOGLER.

TRUNK.

No. 6,849. Reissued Jan. 11, 1876.

Witnesses:
Chas Murman
R. N. Dyer

Inventor:
Herman Vogler.
by Geo. W. Dyer Sole Attyp.

N. PETERS, PHOTO-LITHOGRAPHER, WASHINGTON, D. C.

UNITED STATES PATENT OFFICE.

HERMANN VOGLER, OF CHICAGO, ILLINOIS.

IMPROVEMENT IN TRUNKS.

Specification forming part of Letters Patent No. 155,601, dated October 6, 1874; reissue No. 6,849, dated January 11, 1876; application filed December 3, 1875.

*To all whom it may concern:*

Be it known that I, HERMANN VOGLER, of Chicago, in the county of Cook and State of Illinois, have invented an Improvement in Trunks, of which the following is a description, clear and exact, as required by law.

The nature of my invention relates to an improvement in trunks of that class which are provided with trays in the upper part of the box which forms the body of the trunk; and the object of the invention is to so hinge the tray to the body of the trunk as to enable the former to be lifted out of the latter, if it be desired to remove it.

Figure 1:
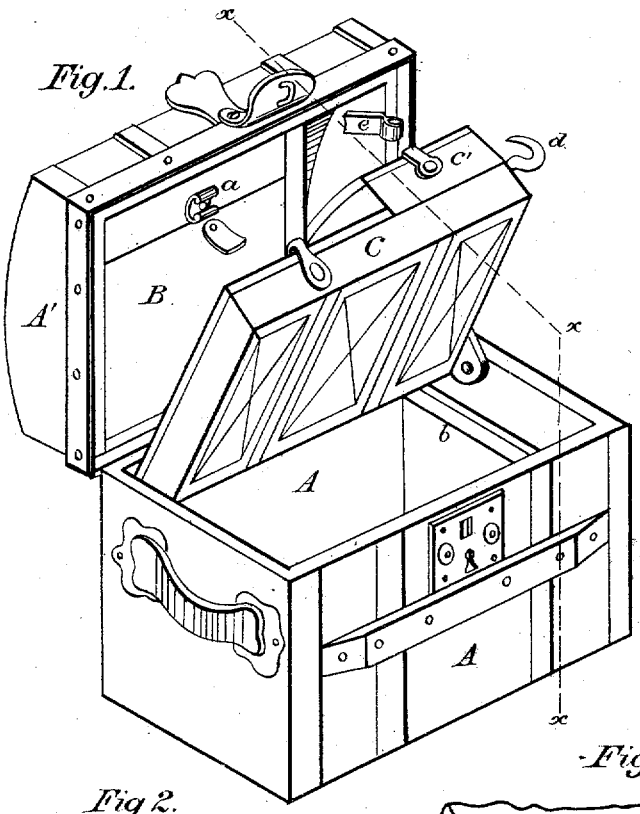
Figure 2:
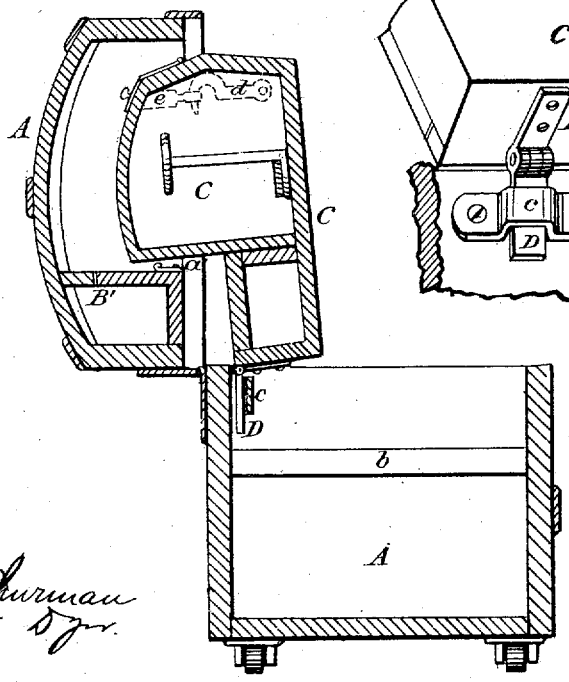
Figure 3:
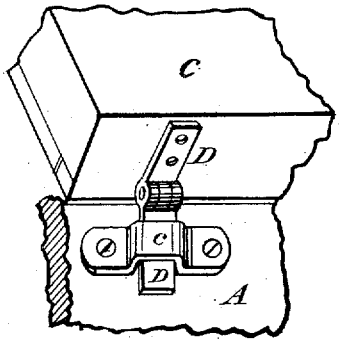

Figure 1 is a perspective view, showing my trunk open and the tray partly swung up. Fig. 2 is a cross-section at *x x* in Fig. 1. Fig. 3 is a section, showing an enlarged view of the tray-hinge.

In the drawing, A represents the box or body of a trunk, having a top, A′, hinged to the back thereof in the usual way. One part of the top is partitioned off to form a top locker, which is closed by a flap-cover, B, hinged thereto and fastened by a turn-buckle, *a*. The back part of the open end is divided from the main recess by a longitudinal partition into a small receptacle, closed by a flap-cover, B′, which is secured by a turn-buckle, *a′*, in Fig. 2. C is the tray of the trunk, supported therein in the usual manner by cleats *b*, fastened across the interior ends of the trunk. This tray may be divided off into compartments, as convenience or fancy may require, and they may be provided with the usual flap-covers. To the back wall of the tray two strap-hinges, D, have one leaf of each secured thereto, the other leaf hanging free.

To hinge the tray to the trunk the loose leaves of these hinges are inserted in the sockets *c*, which are secured to the upper part of the back wall of the trunk, when the tray may be swung up against and into the top when the trunk is open, giving free access to its interior for packing or unpacking, without the necessity of removing the tray.

The peculiar advantage of this, in addition to that already described, is that hinging the tray in substantially the manner described, permits it to be lifted out and removed from the trunk, if it becomes necessary. This makes it very convenient for travelers, for the tray may, with the toilet conveniences it contains, be removed and placed on a table, which could not be done were the tray hinged to the trunk in the ordinary manner.

I do not wish, however, to be confined to the particular form of hinge shown, as it is evident that a hinge of any other construction, so made that only one part is rigidly secured, and adapted to allow the tray to be removed, may be used to produce the same result.

A hook, *d*, at one end of the tray, engaging with an eye, *e*, in the top, may be employed to hold the tray in its raised position.

What I claim as my invention, and desire to secure by Letters Patent, is—

1. In a trunk, and in combination therewith, a tray removably hinged in the body of the said trunk, substantially as and for the purpose set forth.

2. In a trunk, a compartment-tray provided with the strap-hinges, in combination with sockets attached to the back and inside of the trunk-body, substantially as described, for the purpose of removably hinging the tray.

HERMANN VOGLER.

Witnesses:

WM. H. LOTZ,

WM. HOFFMAN.